United States Patent Office 3,553,018
Patented Jan. 5, 1971

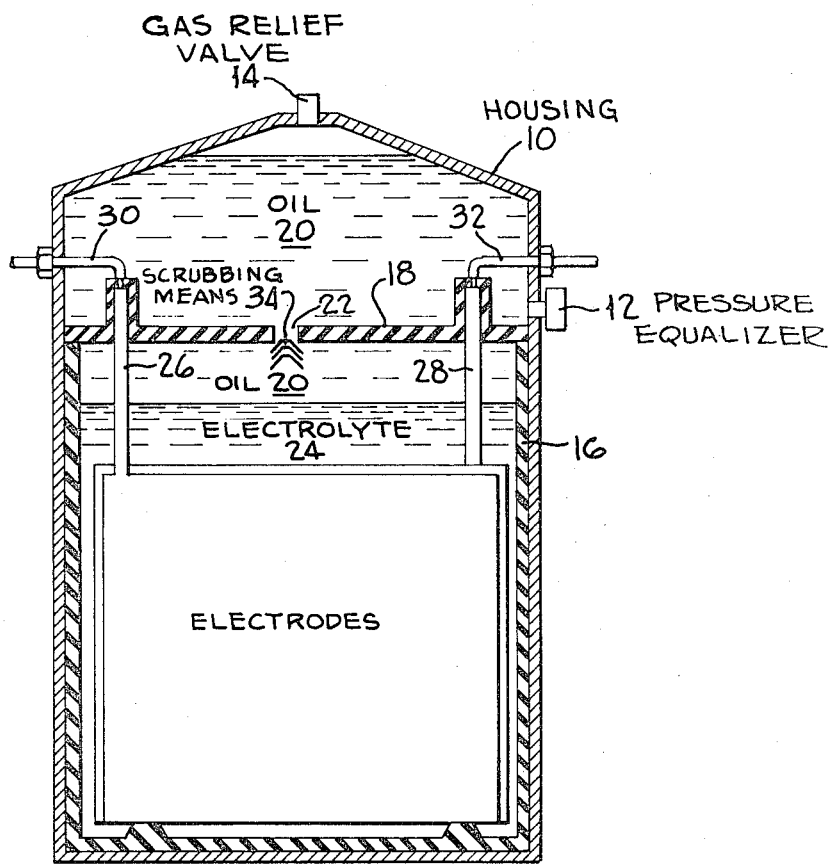

3,553,018
PRESSURE EQUALIZED DEEP SUBMERGENCE BATTERY HAVING GAS BUBBLE-ELECTROLYTE SCRUBBING MEANS BENEATH THE COVER
Earl L. Daniels, Jr., Dresher, and Elmer M. Strohlein, Philadelphia, Pa., assignors to ESB Incorporated, a corporation of Delaware
Filed Sept. 26, 1968, Ser. No. 762,792
Int. Cl. H01m 1/06
U.S. Cl. 136—6          2 Claims

ABSTRACT OF THE DISCLOSURE

A pressure equalized deep submergence battery for immersion in a salt or fresh water medium comprises the combination of a battery situated within a housing filled with an electrically nonconductive liquid such as oil. The housing is pressure equalized. The cover over each cell of the battery has an opening which provides access by the oil to the electrolyte in the interior of the cell, and each cell has an oil-electrolyte interface beneath the cover. The battery is provided with a gas bubble-electrolyte scrubbing means in the layer of oil beneath the cell cover.

CROSS-REFERENCE TO RELATED APPLICATION

This application is related to the following other application:
"Deep Submergence Battery Having Gas Bubble-Electrolyte Scrubbing Vent Cap," Ser. No. 762,893, filed Sept. 26, 1968 in which Laurance Bridge, Walter J. Horner and Harold F. Triel are the inventors.
The two applications, which are being filed concurrently, have been assigned to a common assignee.

BACKGROUND OF THE INVENTION

So they will not be crushed by the water pressure at great depths, liquid electrolyte deep submergence batteries for use in water must be so constructed that the pressure of the liquid inside the battery equals the pressure of the liquid outside. One way to achieve the pressure equalization is by providing an opening in the cover of each cell in the battery, but this creates the problem that to prevent unwanted discharge of the battery into the water the electrically conductive water must be kept away from contact with the electrolyte inside each cell. To prevent this discharge from occurring and to prevent the water and electrolyte from mixing it is customary to have a layer of non-conductive oil or other liquid between the water and the electrolyte, which oil is contained in a housing which must also be pressure equalized. The housing containing the battery and oil is then immersed in water. The pressure equalized housing and the oil are the media through which the pressure of the water outside the housing is transmitted to the electrolyte in the interior of the battery, and the oil is also an electrical nonconductor which insulates the battery terminal posts and electrodes from discharge against the water or housing. For constructions embodying these general principles see U.S. Pat. Nos. 3,160,525 (issued to W. E. Hutchinson et al., on December 8, 1964) and 3,166,446 (issued to W. E. Hutchinson on Jan. 19, 1965).
As the pressure equalized battery is submerged the increasing pressure causes the electrolyte to be compressed into a decreasing volume, and to be sure that the battery always has sufficient electrolyte even at great depths it has been common to provide an inverted collapsible bottle or reservoir containing excess electrolyte atop each cell of the battery; the collapsible bottle also serves as a pressure equalizing device. The interface of non-conductive oil and electrolyte is then in the bottle or reservoir rather than beneath the cell covers. (For a deep submergence battery also having an inverted bottle of excess electrolyte mounted atop each cell, see U.S. Pat. No. 3,208,884, issued to D. C. Jensen on Sept. 28, 1965. With Jensen's construction the battery is not situated in a housing filled with oil, and therefore there is no oil-electrolyte interface.) Use of these bottles or reservoirs atop the cells has produced several problems, however. In addition to increasing the cost of the construction the bottles also increase the height substantially and sometimes this is undesirable; the increased height means that there is greater height in the housing, increasing the cost of the housing and increasing the volume of non-conductive oil required to fill it. Such normal maintenance and inspection of the battery as addition of electrolyte and checking the specific gravity of the electrolyte is made difficult when a bottle must first be removed from atop each cell before this work can be done. Also, where the tops of the bottles were provided with an unchecked hole or opening to permit gas bubbles to be vented from the interior of the battery (see the Hutchinson Pat. No. 3,160,525) there was a tendency for the electrolyte to splash out through these holes, possibly causing corrosion to the housing and other apparatus and creating a conductive path through the oil which cold facilitate discharge of the battery electrodes against the housing. The tendency for electrolyte to splash out of the bottles could be eliminated by placing a gas venting valve in the hole at the top of each bottle (see the Hutchinson Pat. No. 3,166,446; see also the Jensen patent), but these valves have not been designed to scrub from the gas bubbles formed on charge or discharge of the battery the drops of electrolyte which these bubbles carry with them, and so even with that construction there has remained the possibility that electrolyte could escape from the interior of each cell.

SUMMARY OF THE INVENTION

With this invention the bottles which projected upward from atop each cell in other constructions are eliminated, and the oil-electrolyte interface is beneath the cover in each cell. The increased cost due to the bottles, the extra height of the housing, and the extra volume of oil needed to fill the excessively high housing are eliminated, as is the labor required to install the bottles. Maintenance and inspection of the battery is made easier by the elimination of these bottles. The tendency for electrolyte to escape from the interior of each cell by splashing or by rising gas bubbles is greatly reduced by providing each cell of the battery with a gas bubble-electrolyte scrubbing means in the layer of oil beneath the cell cover.
The invention is applicable to single cell and multicell batteries, and is applicable to a variety of electrochemical couples including, but not necessarily limited to, lead-acid, silver-zinc, nickel-iron, nickel-cadmium, and silver-cadmium couples.

BRIEF DESCRIPTION OF THE DRAWING

The drawing shows a pressure-equalized housing containing a non-conductive oil in which a battery is submerged. The oil has access to the interior of each cell through a hole in the cell cover and creates an oil-electrolyte interface beneath the cover of each cell. A gas bubble-electrolyte scrubbing means is shown in the layer of oil beneath the cell cover.

DESCRIPTION OF THE PREFERRED EMBODIMENTS

The drawings shows in general terms a construction embodying the present invention. A housing 10 equipped with a pressure equalizing device 12 and a gas relief valve 14 contains a battery or cell 16 over the top of which is a cell cover 18. The interior of the housing is filled with an electrically non-conductive oil or other liquid 20 which has access to the interior of the battery through an opening 22 in the cover. (Throughout the remainder of this discussion and in the claims the word "oil" will be used to mean any electrically non-conductive liquid which floats on top of the electrolyte and is compatible with the electrolyte, housing, and other components of the combination. While there may be some such liquids which are technically not "oils," the term "oil" will be used for the sake of simplicity since the liquids commonly used for this purpose are oils.) The oil and electrolyte 24 form an interface beneath the cover, and the oil extends above the cell cover. Positive and negative terminal posts 26 and 28 respectively lead from the electrodes within the battery case through the cover and are connected by cables 30 and 32 which extend through the housing walls. The drawing shows the cables 30 and 32 as being electrically insulated, but since the oil 20 serves as an insulator this separate insulation surrounding the cables is not an essential requirement. The construction shown in the drawing may have additional standard features as a removable cover for the housing, liquid drains, etc., but further reference to them will be omitted since they are not germane to an understanding of the present invention.

While one essential feature of the shown construction is that the pressure of the liquids inside the housing 10 be made equal to the pressure of the water outside, there are numerous constructions which would meet this requirement. The housing itself might be made from a material such as rubber or a plastic which is sufficiently flexible so that the container deforms in response to the outside pressure until the outside and inside pressures are equal; see U.S. Pat. No. 3,391,021 (issued to J. A. Orsino on July 2, 1968) which shows a portion of the unhoused battery casing being flexible to function as a pressure equalizer, a principle which can also be applied to the construction of a housing surrounding the battery. Alternatively the housing may be rigid and be provided with an externally or internally projecting appendage which equalizes pressure, or a pressure equalizing diaphragm may be built into an otherwise rigid wall of the housing. The construction shown in the figure is to this extent only schematic and is intended to include pressure equalized housings of all constructions.

Another frequently desirable but perhaps not always essential feature used in association with the housing is a gas relief valve. Again, there are many different types of valves which could be used (see the Hutchison, Jensen, and Orsino patents) and for simplicity a schematic representation of a valve is shown at the top of the housing. It is desirable but not essential to have the gas relief valve at the highest point in the housing, and the top of the housing shown in the figure is so constructed.

Beneath the opening in the cell cover and situated in the layer of oil is a gas bubble-electrolyte scrubbing means 34. While shown in the drawing as a series of baffle plates, this scrubbing means may also be of many different constructions, including consisting of matted or porous materials or a collection of discrete particles. Whatever the construction or configuration, the gas bubble-electrolyte scrubbing means should be made of a material which is chemically compatible with the electrolyte and oil, and materials such as plastics, some rubbers, ceramics, and others are compatible with both acid and alkaline electrolytes and with most oils. Whether matted or porous materials or collections of discrete particles are used, the scrubbing means should provide a tortuous path for the gas bubbles which will break up the bubbles and cause the electrolyte drops to return to the battery electrolyte below. Thus the passageways within the scrubbing means must be large enough to permit the passage of bubbles but not so large that the bubbles pass through with such ease that they are not broken. The size and number of the passageways within the scrubbing means are thus related to the size and number of bubbles generated during charge or discharge, and these features are in turn dependent upon such factors as the electrochemical couple involved, the rate of charge or discharge, the type and amount of oil being used, the pressure and temperature in which the bubbling occurs, the geometrical configuration of the battery and perhaps others.

The depth of the oil beneath the cell covers is also a factor which must be considered in the design of our deep submergence battery. It is undesirable to permit the oil-electrolyte interface to go as far down into the battery as the tops of the electrodes since an oil coating on the surface of the active material of the electrode prevents or retards the electrochemical activity of the active material. The vertical elevation of this oil-electrolyte interface within the battery depends not only upon the initial elevation of that interface before the battery is submerged but also upon the amount of volumetric compression of the electrolyte due to the pressure of submergence, the angle at which the battery is tilted while submerged, and the ability of the scrubbing means to prevent the electrolyte from getting outside the battery. As can be seen, the level of that interface may lower if the scrubbing means does not effectively scrub the drops of electrolyte from the gas bubbles. The scrubbing means should be positioned so as to be above the oil-electrolyte interface at all times.

The deep submergence battery of the cross-referenced application differs from ours by having a gas bubble-electrolyte scrubbing gas vent fitted into the opening in the cell cover rather than being below the cover.

We claim:

1. A pressure equalizer deep submergence battery for immersion in a water medium comprising the combination of:
    (a) a housing containing an electrically non-conductive oil, the housing having means for equalizing the pressure of the oil inside the housing with the pressure of the water outside the housing;
    (b) a battery situated within the housing, the battery having a cover over each cell, each cover being provided with an opening which provides access by the oil to the interior of the cell, each cell having an oil-electrolyte interface beneath the cover; and
    (c) a gas bubble-electrolyte scrubbing means in the layer of oil beneath the cell cover.

2. The battery of claim 1 in which the gas bubble-electrolyte scrubbing means comprises a series of baffle plates.

References Cited
UNITED STATES PATENTS

| | | | |
|---|---|---|---|
| 2,930,828 | 3/1960 | Herold | 136—170X |
| 3,160,525 | 12/1964 | Hutchison et al. | 136—166X |
| 3,166,446 | 1/1965 | Hutchison | 136—166X |

DONALD L. WALTON, Primary Examiner

U.S. Cl. X.R.

136—153, 166, 178